United States Patent [19]

Lagerqvist

[11] 4,132,417
[45] Jan. 2, 1979

[54] PRESSURE RESPONSIVE SEALING MEANS

[75] Inventor: Roy S. G. Lagerqvist, Akarp, Sweden

[73] Assignee: Kommanditbolaget United Stirling (Sweden) AB & Co., Malmo, Sweden

[21] Appl. No.: 856,081

[22] Filed: Nov. 30, 1977

Related U.S. Application Data

[63] Continuation of Ser. No. 699,478, Jun. 24, 1976, abandoned.

[51] Int. Cl.² .............................. F16J 9/02; F16J 9/08
[52] U.S. Cl. ........................................ 277/27; 277/75; 277/168; 277/194; 277/198
[58] Field of Search ................. 277/75, 139, 194, 195, 277/198, 216, 3, 27, 168

[56] References Cited

U.S. PATENT DOCUMENTS

| 1,699,135 | 1/1929 | Cronin | 277/194 |
|---|---|---|---|
| 1,749,832 | 3/1930 | Morton | 277/197 X |
| 2,212,335 | 8/1940 | Wenzel | 277/75 |
| 2,634,179 | 4/1953 | Haverly | 277/194 X |
| 2,807,511 | 9/1957 | Fleming | 277/216 |
| 2,927,831 | 3/1960 | Tuczek | 277/198 |
| 3,066,943 | 12/1962 | Brenneke | 277/139 |
| 3,214,182 | 10/1965 | Herbruggen | 277/75 X |
| 3,632,121 | 1/1972 | Wahlmark | 277/194 |
| 3,893,675 | 7/1975 | Jeffroy | 277/194 |

FOREIGN PATENT DOCUMENTS

| M20323 | 7/1956 | Fed. Rep. of Germany | 277/198 |
|---|---|---|---|
| 962298 | 4/1957 | Fed. Rep. of Germany | 277/168 |

Primary Examiner—Robert S. Ward, Jr.
Attorney, Agent, or Firm—Laurence R. Brown

[57] ABSTRACT

A sealing device such as a piston ring has an L shaped cross section with primary and secondary sealing surfaces held in contact. The device is mounted in a groove to dispose the primary sealing surface against two relatively movable members and the secondary sealing surface substantially normal thereto.

7 Claims, 4 Drawing Figures

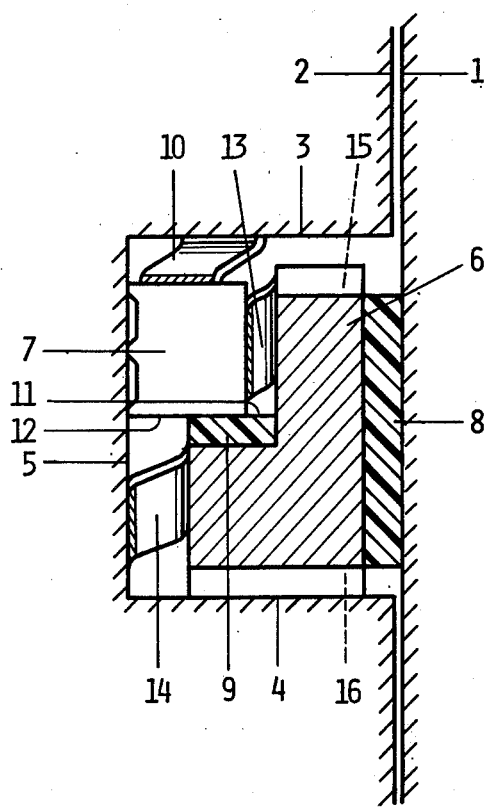
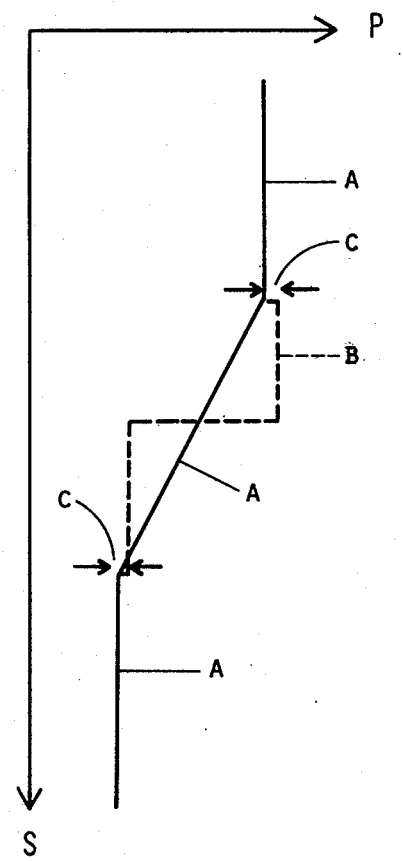
Fig. 1
Fig. 2

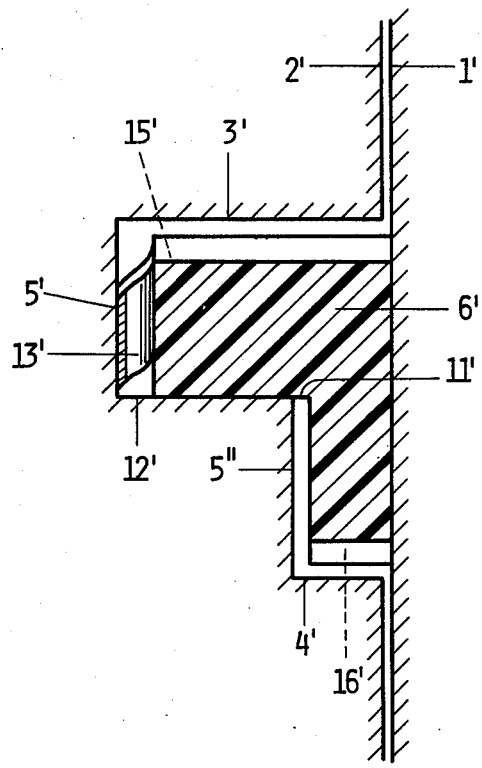
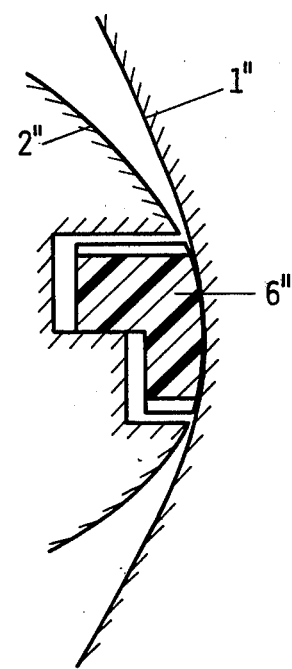
Fig. 3
Fig. 4

PRESSURE RESPONSIVE SEALING MEANS

This is a continuation of application Ser. No. 699,478, filed June 24, 1976, now abandoned.

This invention relates to a sealing device of the kind (herein called "the kind defined") used for preventing or limiting leakage of pressurised fluid between a first primary surface and a second primary surface, said primary surfaces being subject to relative movement, there being a sealing member located in a groove interrupting the second primary surface, the sealing member being acted upon by the pressure of the fluid and urged against the first primary surface so that mutually abutting primary sealing surfaces are constituted by a surface of the sealing member and the first primary surface.

In a sealing device of the kind defined the sealing member must be forced against the second primary surface so that an adequate sealing effect is obtained under all working conditions i.e. independently of the pressure level and the pressure drop across the seal. However, any excessive force will increase the wear of the sealing member, particularly if the sealing device is not lubricated.

The present invention is intended to provide a sealing device of the kind defined in which the sealing member will be forced against the second primary surface automatically to an extent sufficient but not greatly excessive for obtaining the desired sealing effect and dependent upon the prevailing pressure drop across the seal.

According to the invention there is provided a sealing device of the kind defined characterized in that there are two secondary sealing surfaces disposed for abutting against each other in a plane which intersects said primary sealing surfaces and at the intersection is substantially at right-angles to the said primary sealing surfaces, the said intersection being within the middle third of the width of the primary sealing surface of the sealing member measured in the direction of said relative movement, one of said secondary sealing surfaces being provided on said sealing member. Preferably the said intersection is at or substantially at the middle of the said width of the primary sealing surface of the sealing member, and the sealing member may conveniently be of substantially L-shaped cross-section.

How the invention may be put into practice is described in more detail with reference to the accompanying diagrammatic drawings, in which FIG. 1 shows an axial section through a sealing device according to the invention, FIG. 2 is a graph showing variations in fluid pressure on the first primary surface adjacent to the sealing device along the direction of relative movement of the primary surfaces, FIG. 3 is an axial section through a second sealing device according to the invention, and FIG. 4 is a section through a third device according to the invention for use in a rotary piston engine.

FIG. 1 shows a first cylindrical primary surface 1 adjacent to a second cylindrical primary surface 2, the surfaces 1 and 2 being co-axial and moving axially relative to each other. For example, the surface 1 may be that of a cylinder in which moves a piston having the surface 2, or the surface 2 may be on a wall through which extends a rod having the surface 1. The surface 2 is interrupted by an annular groove limited by upper and lower radially extending surfaces 3 and 4 as well as by a cylindrical peripheral groove surface 5. The said groove contains a sealing member comprising a metal ring part 6. Also in the groove is fitted an element in the form of a metal ring 7, the rings 6 and 7 overlapping each other in the axial direction as well as in the radial direction. The metal ring part 6 has an L-shaped cross-section, and there is a layer 8 or polytetrafluoroethylene or other synthetic plastics material on one of its cylindrical surfaces, and a layer 9 of similar material on a shoulder surface of the ring part 6. A resilient steel strip 10 is mounted between the surface 3 and the metal ring part 7, thus exerting a downwardly directed force upon said ring 7 and therethrough upon the ring part 6, which is thus urged against the surface 4.

The upper surface 11 of the layer 9 and an engaging surface 12 of the ring 7 form a pair of secondary sealing surfaces and establish an effective seal preventing leakage of fluid between the ring parts 6 and 7. A resilient steel strip 13 urges the ring parts 6 and 7 away from each other, thus effecting a seal between the ring part 7 and the surface 5 as well as between the layer 8 and the surface 1. A resilient steel strip 14 urges the ring part 6 outwardly, thus assisting the effect of the strip 13 in obtaining a seal between the layer 8 and the surface 1.

It can be seen that mutually abutting primary sealing surfaces are constituted by a surface of the layer 8 of the sealing member and the first primary surface 1. The two secondary sealing surfaces 11 and 12 abut against each other in a plane which intersects said primary sealing surfaces, and at the intersection the said plane is substantially at right-angles to the said primary sealing surfaces. Also the said intersection is within the middle third of the width of the primary sealing surface of the layer 8 of the sealing member as measured in the axial direction of relative movement of the primary surfaces 1 and 2; the proportions in FIG. 1 are such that the said intersection is approximately 44½% of the said width from the top of the layer 8, but the said intersection may conveniently be at the middle of the said width. The sealing member constituted by the ring part 6 with the layers 8 and 9 is of substantially L-shaped cross-section, and a portion of the sealing member overlaps the said element in the form of the ring 7 in the axial direction of relative movement of the primary surfaces 1 and 2.

Radially extending channels 15 and 16 are provided at the upper and lower ends of the ring part 6 ensuring that fluid has access to those surfaces of the ring part 6 which are engaged by the strips 13 and 14.

The device of FIG. 1 operates as follows, reference being made also to FIG. 2.

FIG. 2 shows a graph in which fluid pressure P is plotted against distance S measured in the axial direction of relative movement of the primary surfaces 1 and 2, and thus the line A represents the variations in fluid pressure measured along the surface 1. The graph shows that the pressure is at a constant high level above the upper end of the sealing layer 8. Below the lower end of the sealing layer 8 the fluid pressure is at a constant lower level. The fluid pressure drop over the width of the layer 8 in the said direction may be assumed for the present purposes to be substantially as shown by the fully drawn line A.

The fluid under high pressure above the sealing member will have access to the resilient strip 13 and adjacent side of the ring part 6 from the top down as far as the level of the secondary sealing surface 12. Likewise the fluid under lower pressure below the sealing layer 8 will have access to the resilient strip 14 and adjacent side of the ring part 6 from the bottom up as far as the level of the secondary sealing surface 11. Consequently the ring part 6 will be forced in the direction against the surface 1 by the combined effect of the fluid pressures and the spring forces of the strips 13 and 14. This combined effect is shown by the dotted line B.

As shown by the arrows C, the contributions to the pressure between the layer 8 and surface 1 by the strips 13 and 14 may be small compared to the effects due to fluid pressure.

It will be understood that the axial position of the pair of secondary sealing surfaces 11 and 12 will determine the force by which the layer 8 is urged against the surface 1.

If the level of the secondary surfaces 11 and 12 relative to the layer 8 is displaced downwardly the total force between the layer 8 and surface 1 will increase, and vice versa. Thus it will be possible to obtain a "balanced" sealing device i.e. a sealing device in which the force keeping the sealing surfaces together is automatically adapted to suit the effective fluid pressures and the fluid pressure drop across the sealing device. It will be understood that in practice the lines A and B may follow each other, as the ring part 6 will have a substantial equalizing effect which has not been taken into account in the above basic explanation. It will also be understood that with advantage the level of the secondary surfaces 11 and 12 may be at or approximately at the middle of the sealing layer 8 measured in the direction of relative movement between the primary sealing surfaces.

The ring parts 6 and 7 may be constituted by complementary annular segments or in any other suitable manner, but are preferably of the split type with lap ends.

In many applications the sealing device needs to resist flow in only one direction across the sealing device.

FIG. 3 shows a sealing device according to the invention for allowing flow of fluid in one direction (upwards) but preventing flow of fluid in the opposite direction.

FIG. 3 shows a sealing device comparable to that of FIG. 1 and having primary sealing surfaces 1' and 2', the surface 2' being interrupted by a groove limited by surfaces 3', 4', 5' and 5" as well as by a secondary sealing surface 12' provided on a shoulder in the groove.

The surfaces 1' and 2' are co-axial cylindrical surfaces relatively movable in their axial direction.

A sealing member consisting of a split ring 6' of plastics material of L-shaped cross-section is provided with a secondary sealing surface 11' adapted to engage the surface 12'. A resilient strip 13' maintains contact between the sealing ring 6' and the surface 1'. Channels 15' and 16' ensure that fluid has access to the surfaces of the sealing member which are not in contact with other surfaces.

It can readily be seen that there are secondary sealing surfaces 11' and 12' abutting against one another in a plane which intersects and is at right-angles to the primary sealing surfaces where the sealing member 6' abuts against the surface 1'.

FIG. 4 shows a sealing device similar in some respects to that of FIG. 3, but intended for use as a linear seal in a rotary piston engine, or pump, of which a chamber wall provides a first primary surface 1" and a piston provides a second primary surface 2", the latter having a shouldered groove accommodating a sealing member 6" of substantially L-shaped cross-section so that there are secondary sealing surfaces abutting against each other.

The function of the sealing devices according to FIGS. 3 and 4 is like that of the sealing device of FIG. 1 as long as the fluid pressure keeps the secondary sealing surfaces in contact. However, if the direction of the fluid pressure drop is reversed the secondary sealing surfaces are separated and no sealing effect is obtained. This may sometimes be desired, and in some applications it will never happen. In both such cases the sealing devices of FIGS. 3 and 4 may be preferred to that of FIG. 1.

Various modifications may be introduced within the scope of the following Claims, for example omitting the channels at the top and/or bottom of the sealing members of the devices of FIGS. 3 and 4, and all the parts may be of plastics material or layers of such material may be provided to form any of the primary or secondary sealing surfaces.

What is claim is:

1. A sealing device operable without lubrication located between two relatively movable members such as a piston and a cylinder moving along a motion path to separate two regions containing fluids with substantially different higher and lower fluid pressure magnitudes, comprising in combination, sealing structure presenting a first primary sealing surface comprising a self-lubricating plastic material in contact with the surface of one of said movable members to move therealong over said motion path and presenting a second substantially stationary sealing plastic surface substantially normally disposed to said first sealing surface, a groove in one said member receiving said sealing structure, said second sealing surface being located substantially midway of said first sealing surface, at least one resilient member holding at least said primary sealing surface biased lightly toward contact with its mating surface, and pressure conduit means conveying said fluid of higher pressure against the sealing structure to force both said first and second sealing surfaces together with a force substantially exceeding that of said resilient member and proportional to the differential pressure of the two separated fluids.

2. A sealing device as defined in claim 1 wherein the primary sealing surface is cylindrical in shape, and said sealing structure comprises at least one L-shaped ring member.

3. A sealing device as defined in claim 2 wherein the sealing structure comprises a single L-shaped ring member and said groove is shaped to provide said normally disposed surface mating with the sealing structure.

4. A sealing device as defined in claim 2 wherein said L-shaped ring member is of a plastic material.

5. A sealing device as defined in claim 2 wherein said pressure conduit means comprises channels radially disposed through said ring member at opposite extremities in the direction of travel to thereby dispose both higher and lower pressure fluids in contact with surfaces of said sealing structure disposed on opposite sides of said secondary sealing surface.

6. A sealing device as defined in claim 2 wherein the sealing structure comprises two relatively movable rings, a first one being L-shaped in cross section, and with said secondary surface presented between said two rings.

7. A sealing device as defined in claim 6 wherein the second ring is disposed to exert substantial pressure against the first ring only in a direction moving it against the secondary surface.

* * * * *